United States Patent
Jansen et al.

(10) Patent No.: US 6,612,919 B2
(45) Date of Patent: Sep. 2, 2003

(54) APPARATUS AND METHOD FOR CARRYING OUT A CLEANING OPERATION APPLIED TO THE INTERNAL NECK SKIN OF SLAUGHTERED POULTRY

(75) Inventors: Tom Cornelis Jansen, Oostzaan (NL); Cornelis De Heer, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 0 days.

(21) Appl. No.: 10/114,924

(22) Filed: Apr. 3, 2002

(65) Prior Publication Data

US 2002/0168930 A1 Nov. 14, 2002

(30) Foreign Application Priority Data

Apr. 6, 2001 (NL) .............................................. 1017788

(51) Int. Cl.[7] .............................................. A22C 21/00
(52) U.S. Cl. ...................................................... 452/123
(58) Field of Search ........................ 452/115, 117–120, 452/122, 123, 114, 173, 81

(56) References Cited

U.S. PATENT DOCUMENTS

| | | | | |
|---|---|---|---|---|
| 4,322,872 A | * | 4/1982 | Meyn | 452/168 |
| 4,506,410 A | * | 3/1985 | Markert | 452/124 |
| 4,532,676 A | * | 8/1985 | Simmons | 452/115 |
| 4,723,340 A | * | 2/1988 | Markert | 452/117 |
| 5,178,578 A | * | 1/1993 | Simmons | 452/117 |
| 5,597,350 A | | 1/1997 | Hunking et al. | |
| 5,679,069 A | * | 10/1997 | Van Ochten | 452/122 |
| 5,913,720 A | * | 6/1999 | Scott et al. | 452/120 |
| 6,027,403 A | * | 2/2000 | Hazenbroek et al. | 452/117 |
| 6,176,722 B1 | * | 1/2001 | Longueville | 439/260 |
| 6,176,772 B1 | | 1/2001 | Hazenbroek et al. | |
| 6,213,864 B1 | * | 4/2001 | Griffiths et al. | 452/173 |
| 6,220,952 B1 | * | 4/2001 | Taylor, Sr. et al. | 452/173 |
| 6,398,636 B1 | * | 6/2002 | Jansen et al. | 452/122 |

FOREIGN PATENT DOCUMENTS

| | | |
|---|---|---|
| EP | 0162154 | 11/1985 |
| EP | 0204366 A1 | 12/1986 |
| EP | 0516888 B1 | 10/1993 |
| WO | 9925200 | 5/1999 |

OTHER PUBLICATIONS

EPO Search Report for NL 1017788, Dec. 3, 2001.

* cited by examiner

*Primary Examiner*—Thomas Price
(74) *Attorney, Agent, or Firm*—Dority & Manning

(57) ABSTRACT

An apparatus for carrying out a cleaning operation applied to the internal neck skin of slaughtered poultry by removing the windpipe, gullet, glandular tissue or remainders thereof, includes suspension devices for suspending the poultry by the legs, a presser device, which during the cleaning operation presses on at least a part of the poultry, and a rotatable bore organ to be inserted from the top into the poultry being suspended by the legs for carrying out the cleaning operation. During the cleaning operation, the presser device pushes the neck skin of the poultry toward the bore organ.

14 Claims, 1 Drawing Sheet

APPARATUS AND METHOD FOR CARRYING OUT A CLEANING OPERATION APPLIED TO THE INTERNAL NECK SKIN OF SLAUGHTERED POULTRY

BACKGROUND

The invention relates to an apparatus for carrying out a cleaning operation applied to the internal neck skin of slaughtered poultry by removing the windpipe, gullet, glandular tissue or remainders thereof. Such an apparatus includes suspension devices for suspending the poultry by the legs, presser means, which during the cleaning operation press on at least a part of the poultry, and a rotatable bore organ to be inserted from the top into the poultry being suspended by the legs for carrying out the cleaning operation.

Such an apparatus is known from the European patent application EP-A 0 162 154.

In the known apparatus, presser members engage the back of the poultry suspended by the legs, such as to press it onto springy presser plates, simultaneously positioning the neck of the poultry vertically under the body of the poultry so that during the cleaning operation the bore organ can be inserted accurately through the positioned neck of the poultry.

One drawback of the known apparatus is that under circumstances the cleaning operation applied to the internal neck skin of the slaughtered poultry is not completely effective so that remains of the windpipe, gullet, or glandular tissue may be left behind. This appears to be the case even if the apparatus as known from EP-A 0 162 154 is embodied with a bore organ as known from EP-B 0 516 888.

SUMMARY

It is therefore a principal object of the invention to make the cleaning operation more effective, that is to say to improve the scraping action of the known bore organ, so that the poultry may be stripped more reliably of windpipe, gullet and other tissue that is to be removed. Additional objects and advantages of the invention will be set forth in part in the following description, or may be obvious from the description, or may be learned through practice of the invention.

To this end, the apparatus according to the invention is characterized in that during the cleaning operation the presser means push the neck skin of the poultry toward the bore organ.

This measure effectively assists the scraping action of the bore organ, so that its efficiency is improved.

It is preferred for the presser means during the cleaning operation to push the poultry's neck skin on the breast side towards the bore organ. This assists in particular the effective removal of the windpipe, which due to the nature of the tissue of which the windpipe consists, is usually difficult to remove by means of the bore organ.

A simple manner in which the presser means may be embodied is characterized in that the presser means comprises a presser chock, which during the cleaning operation rests against the neck skin of the poultry at the breast side.

In another aspect of the invention, proper functioning of the apparatus may be ensured by embodying the presser chock such as to be adjustable in height.

This makes it possible at the beginning of the cleaning operation to simply move the presser chock upwards until it reaches a position wherein the pressure chock rests against the neck skin at the breast side of the poultry.

The measure with which the neck skin is pressed against the bore organ is as such quite critical, since on the one hand the scraping action of the bore organ needs to be supported, while on the other hand the scraping action must not result in the neck skin being torn.

An appropriate amount of pressure may be obtained if at the beginning of the cleaning operation the presser chock is moved upwards until the same reaches a position in which the pressure chock supports the poultry, that is to say the presser chock slightly lifts the poultry while the same is suspended by the legs in the hooks.

The invention is also embodied in a method of carrying out the cleaning operation applied to the internal neck skin of slaughtered poultry by removing the air pipe, gullet, glandular tissue or remains thereof, the poultry being suspended by the legs and a presser means being placed such as to act on a part of the poultry, while from the top a bore organ is inserted into the poultry suspended by the legs, for carrying out the cleaning operation.

According to the invention, this method is characterized in that during the cleaning operation the presser means is placed such that it acts on the outside of the neck skin at the breast side of the poultry.

The invention will now be explained in more detail with reference to the drawing of a non-limiting preferred exemplary embodiment.

BRIEF DESCRIPTION OF THE FIGURES

The FIGS. 1 to 4 in the drawing show a number of successive settings of an apparatus for carrying out a cleaning operation applied to the internal neck skin of slaughtered poultry as proposed by the invention.

Identical reference numbers used in the Figures refer to similar parts.

DESCRIPTION

Figure 1:
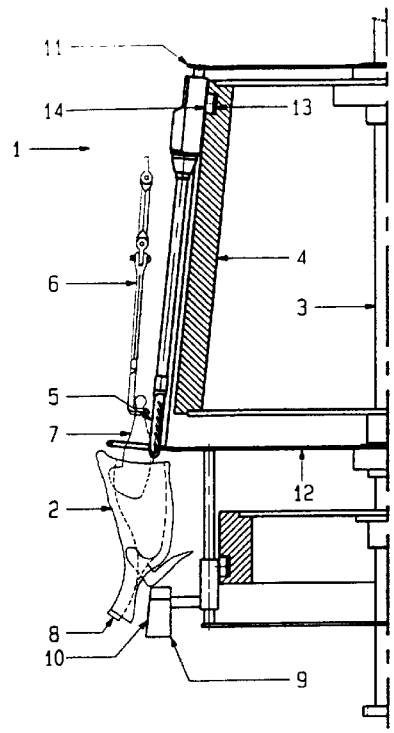

Reference will now be made to various embodiments of the invention, one example of which is shown in the figures. The embodiments are provided by way of explanation of the invention, and not meant as a limitation of the invention. It is intended that the invention include modifications and variations to the embodiments described and shown herein.

The apparatus 1 shown in the figures for carrying out a cleaning operation applied to the internal neck skin of slaughtered poultry 2 comprises a drum 4 and a central axis 3 pertaining to the drum 4. Along the drum 4 movable bore organs 5 are provided. One such bore organ 5 is shown in the FIGS. 1–4. To facilitate their activation, the bore organs are in their longitudinal direction movably mounted on rods, which are fastened to an upper plate 11 and a lower plate 12, rotatable about the axis 3. The upper plate 11 may, for example, be drive by a chain such that the bore organs 5 are moved along the drum 4. The periphery of the drum 4 is provided with a curve formed by a groove 13, which is being traced by a projection 14 that is part of the bore organ 5. In this way the movement of the bore organ 5 along the drum 4 also results in the bore organ 5 making a movement in its longitudinal direction determined by the curve of the groove 13, while at the same time a further mechanism causes the bore organ 5 to rotate during said longitudinal movement.

As further shown in the FIGS. 1–4, the poultry 2 is suspended by the legs from suspension devices 6, for example, hooks.

While the poultry 2 is suspended by the legs 7 from the hooks, moving in correspondence with the movement of the bore organs 5 along the drum 4, the bore organ 5 is activated in the manner explained above as soon as the same moves from the top into the poultry 2 (see FIG. 1 and FIG. 2, respectively), after which it moves such as to exit the poultry 2 via a neck end 8.

The apparatus is further provided with presser means 9 in the form of a presser chock, which is placed from below, against the neck skin of the poultry 2 at the breast side. In this position, which is illustrated in FIG. 2, the presser chock 9 pushes the neck skin of the poultry towards the bore organ 5 such as to enable the latter to effectively scrape the inside of the neck skin of the poultry 2.

The embodiment shown, wherein the presser chock 9 pushes the neck skin at the breast side towards the bore organ 5, allows for a considerable tolerance with regard to any possible differences in size of the poultry 2 to be processed. Due to the presence of the presser chock 9 supporting the neck skin from the outside, the internal neck skin can be effectively cleaned when the neck opening 8 is very large, thereby also allowing difficult tissue to be removed. This relates in particular to the windpipe.

Figure 2:
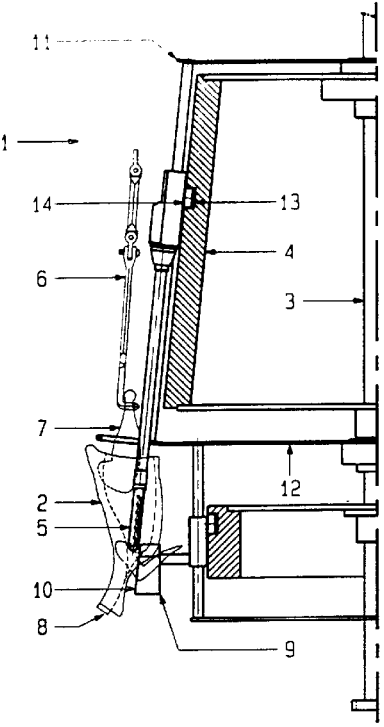
Figure 3:
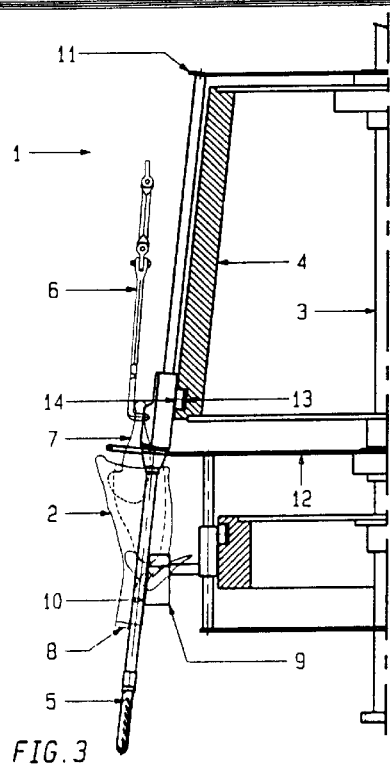

The FIGS. 2 and 3 show that a small space remains between the bore organ 5 and the presser chock 9, between which the neck skin of the poultry 2 can be accommodated so that the cleaning operation to be carried out with the bore organ 5 will not damage the neck skin.

The figures show that the bore organ 5 is disposed at a slight slant. The presser chock 9 has a work surface 10 that corresponds with the slanting disposition of the bore organ 5. In an equally possible completely perpendicular disposition of the bore organ 5, the work surface 10 of the presser chock 9 should be disposed correspondingly perpendicular.

The FIGS. 2 and 3 show the situation where at the beginning of the cleaning operation the presser chock 9 with the bore organ 5 is moved upwards from the initial position shown in FIG. 1, until it assumes a position wherein the presser chock 9 rests against the neck skin at the breast side of the poultry, supporting the same.

Figure 4:
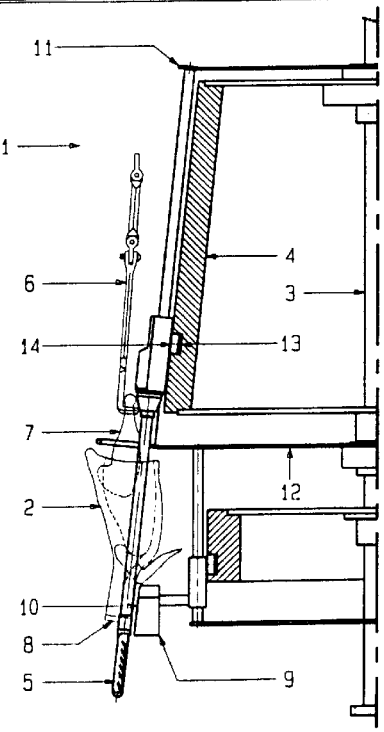

FIG. 4 shows that the bore organ 5 has completed the cleaning operation and is returning to the starting position as shown in FIG. 1. In that situation the presser chock 9 is also returned to the initial position of FIG. 1, so that the poultry 2 is then again suspended from the hooks 6 by the legs 7 only.

It should be appreciated by those skilled in the art that modifications and variations may be made to the embodiments described herein without departing from the scope and spirit of the invention as set forth in the appended claims and their equivalents.

What is claimed is:

1. An apparatus for carrying out a cleaning operation within internal neck skin of slaughtered poultry wherein the windpipe, gullet, glandular tissue, or portions thereof are removed, comprising:

suspension devices configured to suspend the slaughtered poultry by its legs;

a rotatable and longitudinally displaceable bore organ, said bore organ longitudinally movable so as to enter through a top of the suspended poultry and move down and through the suspended poultry to scrape the internal neck skin of the suspended poultry; and means coordinated with downward movement of said bore organ for externally engaging and pressing the neck skin of the suspended poultry towards the bore organ.

2. The apparatus as in claim 1, wherein said engaging and pressing means is disposed so as to engage the neck skin at a breast side of the suspended poultry.

3. The apparatus as in claim 1, wherein said engaging and pressing means moves in a direction towards the top of the suspended poultry.

4. The apparatus as in claim 3, wherein the poultry is suspended in a generally vertical orientation, said engaging and pressing means movable in a generally vertical direction.

5. The apparatus as in claim 4, wherein said bore organ is movable in a direction at an angle of inclination with respect to a vertical plane.

6. The apparatus as in claim 5, wherein said engaging and pressing means comprises an engaging surface disposed at an angle of inclination corresponding generally to said angle of inclination of said bore organ.

7. The apparatus as in claim 1, wherein said engaging and pressing means comprises a chock device having an engaging surface disposed to press against the neck skin of the suspended poultry.

8. The apparatus as in claim 7, wherein said chock device is movably disposed so as to move from a first position away from the suspended poultry to an engaged position against the neck skin of the suspended poultry.

9. The apparatus as in claim 7, wherein said chock device is movable in a generally vertical direction.

10. The apparatus as in claim 9, wherein said chock device is movable to a vertical height such that said chock device supports the poultry.

11. The apparatus as in claim 7, wherein said bore organ is movable in a direction inclined with respect to a vertical plane, said chock device comprising an engaging surface disposed at an angle of inclination corresponding generally to said inclined angle of said bore organ.

12. An automated method for carrying out a cleaning operation within internal neck skin of slaughtered poultry wherein the windpipe, gullet, glandular tissue, or portions thereof are removed from the neck of the poultry, said method comprising:

supporting the poultry in a generally fixed position;

moving a bore organ through an end of the poultry and through the neck of the poultry;

with the bore organ, scraping the internal neck skin of the suspended poultry; and engaging and pressing the external neck skin of the poultry towards the bore organ as the bore organ scrapes the internal neck skin.

13. The method as in claim 12, wherein said supporting step comprises suspending the poultry by its legs.

14. The method as in claim 12, wherein said engaging and pressing step comprises engaging the external neck skin from below and pressing the neck skin towards the bore organ.

* * * * *